(12) United States Patent
Willamowski et al.

(10) Patent No.: US 11,473,928 B2
(45) Date of Patent: Oct. 18, 2022

(54) SYSTEM AND METHOD FOR GENERATING ORIGIN-INDEPENDENT ACCESS MAPS

(71) Applicant: NAVER CORPORATION, Gyeonggi-do (KR)

(72) Inventors: Jutta Willamowski, Grenoble (FR); Antonietta Grasso, Grenoble (FR); Yves Hoppenot, Notre Dame de Mesage (FR); Michel Langlais, Pont de claix (FR)

(73) Assignee: NAVER CORPORATION, Gyeonggi-Do (KR)

( * ) Notice: Subject to any disclaimer, the term of this patent is extended or adjusted under 35 U.S.C. 154(b) by 150 days.

(21) Appl. No.: 16/824,930

(22) Filed: Mar. 20, 2020

(65) Prior Publication Data

US 2020/0378786 A1    Dec. 3, 2020

(30) Foreign Application Priority Data

May 29, 2019    (EP) .................................... 19305694

(51) Int. Cl.
  *G01C 21/36*    (2006.01)
  *G01C 21/34*    (2006.01)

(52) U.S. Cl.
  CPC ..... *G01C 21/3685* (2013.01); *G01C 21/3423* (2013.01); *G01C 21/3476* (2013.01); *G01C 21/3605* (2013.01)

(58) Field of Classification Search
  CPC ............ G01C 21/3685; G01C 21/3423; G01C 21/3476; G01C 21/3605; G01C 21/3644
  See application file for complete search history.

(56) References Cited

U.S. PATENT DOCUMENTS

| 7,584,051 B2 | 9/2009 | Hayashi |
| 8,463,543 B2 | 6/2013 | Waldman et al. |
| 8,798,918 B2 | 8/2014 | Onishi et al. |
| 9,127,955 B2 | 9/2015 | Tsimhoni et al. |

(Continued)

FOREIGN PATENT DOCUMENTS

AU    2010202509 A1 *    3/2011    ......... G01C 21/3644

OTHER PUBLICATIONS

Duckham, Matt, Stephan Winter, and Michelle Robinson. "Including landmarks in routing instructions." Journal of Location Based Services4.1 (2010): 28-52.

(Continued)

*Primary Examiner* — Rachid Bendidi

(57) ABSTRACT

A method includes: selecting a set of access points in a focus zone that identifies an area around the travel destination; determining access paths through one or more access points in the set of selected access points; listing crossings that the access paths pass through; for each of the listed crossings: determining a probability that the listed crossing is passed through by an access path; determining at least one complexity score of the listed crossing; determining a set of points of interest (POIs) along access paths passing through the listed crossing; and determining quality scores for the POIs, respectively, the quality score of one of the POIs reflecting a utility of that one of the POIs to facilitate orientation; selecting POIs from the set of POIs based on the quality scores; generating the access map including the access paths and the selected POIs; and outputting the access map.

20 Claims, 6 Drawing Sheets

(56) References Cited

U.S. PATENT DOCUMENTS

| | | | | |
|---|---|---|---|---|
| 2002/0103599 | A1* | 8/2002 | Sugiyama | G01C 21/20 701/426 |
| 2009/0198442 | A1* | 8/2009 | Takagi | G09B 29/102 701/533 |
| 2012/0016583 | A1 | 1/2012 | Cheung et al. | |
| 2013/0006515 | A1* | 1/2013 | Vellaikal | G01C 21/3679 701/410 |
| 2014/0195157 | A1* | 7/2014 | Gupta | G01C 21/206 701/533 |
| 2014/0358603 | A1* | 12/2014 | Viger | G06Q 10/08 705/7.12 |
| 2015/0112593 | A1 | 4/2015 | Kandangath et al. | |
| 2015/0253143 | A1* | 9/2015 | Bailiang | G09B 29/106 701/527 |
| 2017/0004708 | A1* | 1/2017 | Goldberg | G08G 1/0969 |
| 2019/0017842 | A1* | 1/2019 | Moore | G01C 21/3407 |
| 2019/0186933 | A1* | 6/2019 | Greenberg | G01C 21/3476 |
| 2021/0019671 | A1* | 1/2021 | Cao | G06Q 30/0284 |

OTHER PUBLICATIONS

Haque, Shazia, Lars Kulik, and Alexander Klippel. "Algorithms for reliable navigation and wayfinding." International Conference on Spatial Cognition. Springer, Berlin, Heidelberg, 2006.

Kopf, Johannes, et al. "Automatic generation of destination maps." ACM Transactions on Graphics (TOG). vol. 29. No. 6. ACM, 2010.

Michon, Pierre-Emmanuel, and Michel Denis. "When and why are visual landmarks used in giving directions?" International Conference on Spatial Information Theory. Springer, Berlin, Heidelberg, 2001.

Mohammad Mahdian, Okke Schrijvers, and Sergei Vassilvitskii. 2015. Algorithmic Cartography: Placing Points of Interest and Ads on Maps. In Proceedings of the 21th ACM SIGKDD International Conference on Knowledge Discovery and Data Mining (KDD '15). ACM, New York, NY, USA, 755-764.

Richter, Kai-Florian, and Matt Duckham. "Simplest instructions: Finding easy-to-describe routes for navigation." International Conference on Geographic Information Science. Springer, Berlin, Heidelberg, 2008.

Richter, Kai-Florian, and Stephan Winter. "Introduction: What Landmarks Are, and Why They Are Important." Landmarks. Springer, Cham, 2014. 1-25.

Richter, Kai-Florian. "A uniform handling of different landmark types in route directions." International Conference on Spatial Information Theory. Springer, Berlin, Heidelberg, 2007.

Schmid, Falko, Kai-Florian Richter, and Denise Peters. "Route aware maps: Multigranular wayfinding assistance." Spatial Cognition & Computation 10.2-3 (2010): 184-206.

Tom, Ariane, and Michel Denis. "Referring to landmark or street information in route directions: What difference does it make?" International Conference on Spatial Information Theory. Springer, Berlin, Heidelberg, 2003.

Tomko, Martin, and Stephan Winter. "Pragmatic construction of destination descriptions for urban environments." Spatial Cognition & Computation9.1 (2009): 1-29.

Tomko, Martin. Destination descriptions in urban environments. Diss.

CA European Search Report for European Application No. 19305694.2 dated Dec. 3, 2019.

European Office Action for European Application No. 19305694.2 dated Aug. 4, 2022.

* cited by examiner

SYSTEM AND METHOD FOR GENERATING ORIGIN-INDEPENDENT ACCESS MAPS

CROSS REFERENCE TO RELATED APPLICATIONS

This application claims the benefit of European Patent Application No. EP19305694.2, filed on May 29, 2019. The entire disclosure of the application referenced above is incorporated herein by reference.

FIELD

The field of this invention is that of digital map generation. More particularly, the invention concerns systems and methods for generating access maps for a given destination using Points of Interest (POI) to facilitate orientation and wayfinding (e.g., by disambiguating complex crossings) without the need of specifying a starting location.

BACKGROUND

Points of Interest or POIs include landmarks and are elements that aid orientation and wayfinding. It is usual to use landmarks to provide path guiding instructions and to indicate them in access maps. POIs help people on the move constructing a mental representation of an unfamiliar environment in advance and prepare them cognitively to get through difficult or uncertain parts of that environment. Furthermore, for people knowing a city, recognizing POIs on a map may help to localize the destination. It is therefore critical to properly select and integrate appropriate landmarks in navigational supports.

Given the prominent role POIs have in human communication, an important area of research has recently developed in the domain of automated navigation assistance that aims at programmatically exploiting landmarks to "humanize" navigation support.

Navigation support to a destination may be provided by: providing a given user, coming from one specific location, with information about how to reach the destination; or, in a more generic way, by providing anyone within a region with an access map containing information about how to reach the destination. This may be the case for an owner of POI attraction, wishing to generally advert the POI.

Navigation support can be provided at different scales, starting from a high level (i.e., with little precision) to provide an overview on the situation of the destination, and successively moving to more detailed levels to become practical and operational. Different levels of details are therefore needed within an access map.

More details may be needed around the destination whereas less details are required for long homogeneous segments (e.g., a long distance on a highway). Using and integrating different levels of precision is difficult to do programmatically. Access maps are generally generated from geographic maps which display a region at a single homogeneous scale. Depending on their scale, geographic maps may include selected corresponding structural elements like roads, green areas and major buildings like stadiums and churches. With increasing scale, they include more and more details and commercial POIs like restaurants or shops.

Selecting the optimal set of elements to be included in a map in order to help the user grasp the location of the destination is difficult. On the one hand, too many elements may be selected, which create clutter on the map and may distract the user from the relevant elements. On the other hand, relevant elements may not be part of the automatic selection and thus may be missing, not being included in the map.

To improve an access map with a set of POIs, once the critical locations are identified the optimal set of POIs that best disambiguate these locations may be selected and added to the map. To this aim, various parameters can be used, such as POI typicality, unicity, durability, visibility, or relevance with respect to the particular transportation mode or user. These POIs may be indentified based on detailed information about each instance (e.g. visuals) or a computed similarity based on a POIs position with respect to the decision point and its configuration and to the POI category.

SUMMARY

One general aim of the invention is to provide a method to generate an access map to a destination. The access map can be used by anyone, with no need of any indication on the origin where the user starts with a large range of possible distances to the destination. The method proposed addresses all or parts of the drawbacks of approaches proposed in the prior art. It allows both route simplification and the use of relevant POIs selected. It facilitates orientation for the user and disambiguates complex crossings. To this aim and according to one aspect of the present application, it is proposed a method, using a one or more processors executing code, to generate access maps for a given destination, including points of interest (POIs).

It avoids the need to specify an origin and relies instead on access points (e.g., facilities that allows a change of transportation mode, such as bus stations, carparks, metro stations, train stations, airports, bike stands, gondola stations, etc.) and access paths (e.g., paths through access points in and out of a focus zone (e.g., a zone that identifies an area around a travel destination)) for guiding users to a travel destination.

Accordingly, proposed is a method, using one or more processors executing code, to generate an access map for reaching, independent of origin, a travel destination, the method comprising the following steps: a) Selecting a set of access points in a focus zone that identifies an area around the travel destination; b) Computing access paths in and out of the travel destination through one or more access points in the set of selected access points; c) Listing crossings that the computed access paths pass through; d) For each listed crossing, i/ evaluating the probability that the listed crossing is passed through by an access path and calculating at least one complexity rating; ii/ determining a set of POIs along the roads passing through the listed crossing and calculating a quality score for each of POI in the set of POIs, the score for each POI in the set of POIs scoring its utility to facilitate orientation; iii/ selecting POIs from the set of POIs based on their quality scores; e) Generating the access map including the access paths and the selected POIs; f) Outputting the generated access map.

For this purpose, the selecting of step a) can further comprise the following sub-steps: i) Listing existing access points which are in the focus zone around the destination, ii) For each access point in the given focus zone, computing a quality score characterizing its relevancy for the user as a function of various parameters associated with the access point, iii) Selecting the best access points of access points according to their scores.

The computation of the scores can be a function of at least the following parameters: the type of transportation through which the access point can be reached, the access point distance to the destination, and if the access point is public transportation, the number of transportation lines through which it can be reached or, if the access point is a parking facility, its capacity.

Additionally, the access points can be categorized according to the type of transportation through which the access point can be reached and where at least one access point is selected in sub-step ii) of step a), for each type of transportation considered as relevant.

In a particular embodiment, the probability that a given crossing is passed through by at least one access path is calculated as the ratio of the number of access paths traveling through the crossing and the total number of access paths in the focus zone.

For a given access path, a complexity score of a crossing can be calculated as a function of at least the following parameters: The number roads at the crossing; The need to change direction in the crossing.

The presence of at least a confusing road, which is a road near the outbound road of the access path forming an angle smaller than a given threshold with the outbound road of the access path.

The method can further comprise the computation of a quality score of a POI which is a building or which is hosted in a building. The quality score being a function of a saliency score based on the following parameters: the length of the facade of the building on the map; the distance of the closest point of the facade to the crossing; the height of the building.

Further, POIs can be categorized in different types, and saliency scores can be assigned to the types of POIs and where the quality score of a given point of interest (POI) belonging to one of the types is a function of the saliency score assigned to at least one type of POI.

In addition, the selection of POIs for a given crossing can be performed through the following sub-steps: Listing all POIs within a given distance from the crossing; Computing a bounding box around the outbound road of the access path, the bounding box having a given length corresponding to a visibility range from the crossing and a given width so as to include the buildings on each side of the road; Selecting the POIs within the bounding box; Computing a quality score being the saliency score of the POIs multiplied by a weight; Selecting the POIs according to their quality score.

The weight applied to the saliency score of a POI to compute the quality score of the POI depends on whether the POI is located in the inbound road, the outbound road or another road of the crossing, the weight is used to promote POIs located in the outbound road of the access path and penalize POIs not belonging to the access path.

The selection of the POIs to display on the map, can be done by iterating through the following steps until the number of POI reaches the specification of the user, starting with a list of crossings containing all the crossings passed through in at least one access path: 1/ Normalizing the POIs quality scores across the map; 2/ Normalizing the complexity score of the crossings in the list across the map; 3/ for each crossing where a POI appears, summing the product of the crossing probability, the normalized crossing complexity and the normalized quality score of the POIs; 4/ Selecting the POI with the highest sum in order to display it on the map; 5/ Remove the crossing associated with the selected POI from the list of crossings; 6/ Returning to 1/.

The method can further include the following for the generation of an access map including the access paths and relevant POIs: Representing the destination on the map; Representing the selected POIs on the map and adding information about the nature of the POI; Representing the selected transportation access points on the map; Representing the unused features of the map as background, such as un-passed through roads, non-POI parks or squares; Highlighting roads passed through in at least one access path; Highlighting transportation lines in the focus zone that goes through at least one selected transportation access point; Highlighting transportation lines outside the focus zone when they link a main access point to a selected transportation access point inside the focus zone.

According to complementary aspects, the invention provides a computer program product, comprising code instructions to execute a method according to the previously described aspects for generating a humanized access map; and a computer-readable medium, on which is stored a computer program product comprising code instructions for generating a humanized access map.

In a feature, a method of generating an access map for reaching, independent of origin, a travel destination is described. The method includes: by one or more processors, selecting a set of access points in a focus zone that identifies an area around the travel destination; by the one or more processors, determining access paths to and from the travel destination through one or more access points in the set of selected access points; by the one or more processors, listing crossings that the determined access paths pass through; by the one or more processors, for each of the listed crossings: determining a probability that the listed crossing is passed through by an access path; determining at least one complexity score of the listed crossing; determining a set of points of interest (POIs) along access paths passing through the listed crossing; and determining quality scores for the POIs, respectively, of the set of POIs, the quality score of one of the POIs reflecting a utility of that one of the POIs to facilitate orientation; by the one or more processors, selecting POIs from the set of POIs based on the quality scores of the POIs, respectively; by the one or more processors, generating the access map including the access paths and the selected POIs; and by the one or more processors, outputting the access map.

In further features, selecting a set of access points includes: listing all access points which are in the focus zone around the travel destination; determining quality scores for the access points in the focus zone, respectively, the quality score of an access point indicative of a relevance of the access point to a user in navigating to the travel destination; and selecting a predetermined number of the access points with the highest quality scores as the set of access points.

In further features, determining the quality scores includes determining the quality score for an access point based on: a type of transportation through which the access point can be reached; a distance between the access point and the travel destination; and if the access point is public transportation, a number of public transportation lines through which the access point can be reached.

In further features, determining the quality scores includes determining the quality score for an access point based on: a type of transportation through which the access point can be reached; a distance between the access point and the travel destination; and if the access point is a parking facility, a vehicle capacity of the parking facility.

In further features, determining the quality score of an access point includes determining the quality score of the access point based on a type of transportation usable to reach the access point.

In further features, determining a probability that the listed crossing is passed through by an access path includes setting the probability based on a ratio of a number of access paths traveling through the crossing to a total number of access paths in the focus zone.

In further features, determining the complexity score of a listed crossing includes determining the complexity score of the listed crossing based on: a number roads at the listed crossing; and a need to change direction at the crossing.

In further features, determining the complexity score of a listed crossing includes determining the complexity score of the listed crossing based on whether an outbound access path at the listed crossing forms an angle that is less than a predetermined angle relative to an inbound access path used to reach the listed crossing.

In further features, determining a set of POIs along access paths passing through the listed crossing includes adding a building located within a predetermined distance of the listed crossing to the set of POIs.

In further features: determining the quality score of the building includes determining the quality score of the building based on a saliency score of the building; and the method further includes determining the saliency score of the building based on characteristics of the building.

In further features, the method further includes determining the saliency score of the building based on: a length of a facade of the building; a distance between a closest point of the facade and the listed crossing; and a height of the building.

In further features: determining quality scores for the POIs includes determining the quality score of a POI based on a saliency score of the POI; and the method further includes determining the saliency score of the POI based on a type of the POI.

In further features, generating the access map further includes adding predetermined POIs stored in memory to the access map.

In further features, generating the access map further includes adding graphical representations of the predetermined POIs to the access map.

In further features, determining a set of POIs along access paths passing through the listed crossing includes: listing all POIs within a predetermined distance from the listed crossing; determining a bounding box around an outbound access path of the listed crossing, the bounding box having a predetermined length corresponding to a visibility range from the listed crossing and a predetermined width to include buildings on each side of the outbound access path; selecting ones of POIs the listed within the bounding box; determining the quality scores of the selected ones of the POIs listed within the bounding box; and selecting POIs from the selected ones of the POIs listed within the bounding box based on the quality scores for the set of POIs.

In further features, determining the quality scores of the selected ones of the POIs listed within the bounding box includes determining the quality score of a selected one of the POIs listed within the bounding box based on whether the selected one of the POIs listed within the bounding box is located on an inbound path of the crossing, an outbound path of the crossing, or another type of path of the crossing.

In further features, determining the quality score of the selected one of the POIs listed within the bounding box includes: setting the quality score of the selected one of the POIs listed within the bounding box to a first score when the selected one of the POIs listed within the bounding box is located on an outbound path of the crossing; and setting the quality score of the selected one of the POIs listed within the bounding box to a second score when the selected one of the POIs listed within the bounding box is located on an inbound path of the crossing, where the first score is greater than the second score.

In further features, outputting the access map includes at least one of: displaying the access map on a display; and outputting information of the access map via a speaker.

In further features, selecting POIs from the set of POIs based on the quality scores of the POIs, respectively, includes selecting k of the POIs from the set of POIs having the k highest quality scores, respectively, where k is an integer greater than two.

In further features, generating the access map includes: representing the access paths and the selected POIs on the access map; representing the travel destination on the access map; representing transportation access points on the access map; highlighting paths passing through at least one of the access paths; and not highlighting paths that do not pass through at least one of the access paths.

In a feature, a system for generating an access map for reaching, independent of origin, a travel destination is described. The system includes: one or more processors; and memory including code that, when executed by the one or more processors, perform functions comprising: selecting a set of access points in a focus zone that identifies an area around the travel destination; determining access paths to and from the travel destination through one or more access points in the set of selected access points; listing crossings that the determined access paths pass through; for each of the listed crossings: determining a probability that the listed crossing is passed through by an access path; determining at least one complexity score of the listed crossing; determining a set of points of interest (POIs) along access paths passing through the listed crossing; and determining quality scores for the POIs, respectively, of the set of POIs, the quality score of one of the POIs reflecting a utility of that one of the POIs to facilitate orientation; selecting POIs from the set of POIs based on the quality scores of the POIs, respectively; generating the access map including the access paths and the selected POIs; and outputting the access map.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION

The access map generation method presented hereunder provides a user with an access map to reach a given destination point (location). The access map allows a zoom effect on a focus zone around the destination point. With the zoom effect, the user is provided with enough information to help guidance in the focus zone (i.e., an area around a destination, e.g., the last mile or miles of pedestrian, bike, or vehicular navigation), while at the same time keeping the context across the full map.

Architecture and General Context

Figure 1:
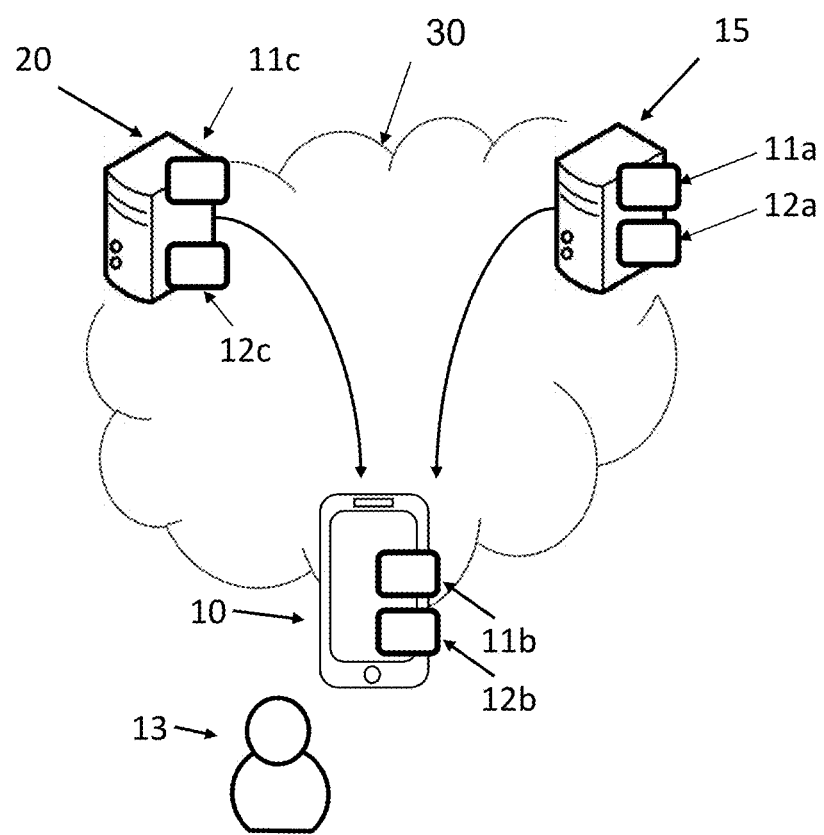
FIG. 1 illustrates an example of architecture in which the method according to the invention can performed.

The methods described herein may be performed within a system architecture such as that illustrated in FIG. 1, which includes two servers 15 and 20 and a computing device 10. The servers 15 and 20 and the computing device 10 communicate over a network 30 (which may be wireless and/or wired) such as the Internet for data exchange. Each server 15 and 20 and the computing device 10 include a data processor (11a, 11c, and 11b, respectively) and memory (12a, 12c, and 12b, respectively) such as a hard disk. The methods described herein may be performed by one or more processors, such as one or more of the processors 11a, 11b, and 11c, by executing code stored in memory. While the servers 15 and 20 and the computing device 10 are illustrated as including one processor, two or more processors may be included.

The server 15 may be a map server, which can be for example an external service accessible by an application programming interface (API), such as Open Street Map (OSM).

The server 20 may be a processing server, using data received from the server 15 over the communication network 30 to generate an access map.

The computing device 10 may be any device that communicates with the server 20, such as a desktop computer, a laptop computer, a cell phone, a tablet, a navigation system (e.g., that may be installed in a car or on a bike), a digital watch or another user wearable device, or another suitable type of computing device. The computing device 10 may be used by a user (user 13 in FIG. 1) to request the generation of a given access map as well as to store a generated access map and to administer its dissemination (e.g., audibly and/or visually) to final end users which are to use the map to reach a destination point.

The user 13 can be an individual wishing to generate an access map for the guidance (e.g., navigation directions) to a destination point. The user can work an entity, such as a store, a company, a museum, etc. which needs to provide access maps to end users (e.g., clients or visitors). The destination point may be user selected and input to the computing device 10.

In one embodiment, the access map generation method presented hereunder operates on the server 20 and/or the computing device 10. Alternatively, the access map generation may operate on the computing device 10.

The two servers 15 and 20 may be merged. In various implementations, the functionality of the two servers 15 and 20 may be merged into a standalone computing device 10.

The access map may be generic for all users. That is, it can be used by any user, independent of a user's starting location and independent of a user's travel distance (i.e., from a user's starting location to the user's final destination). The access map may be generated without (independent of) any starting location.

Access Map Generation

Figure 2:
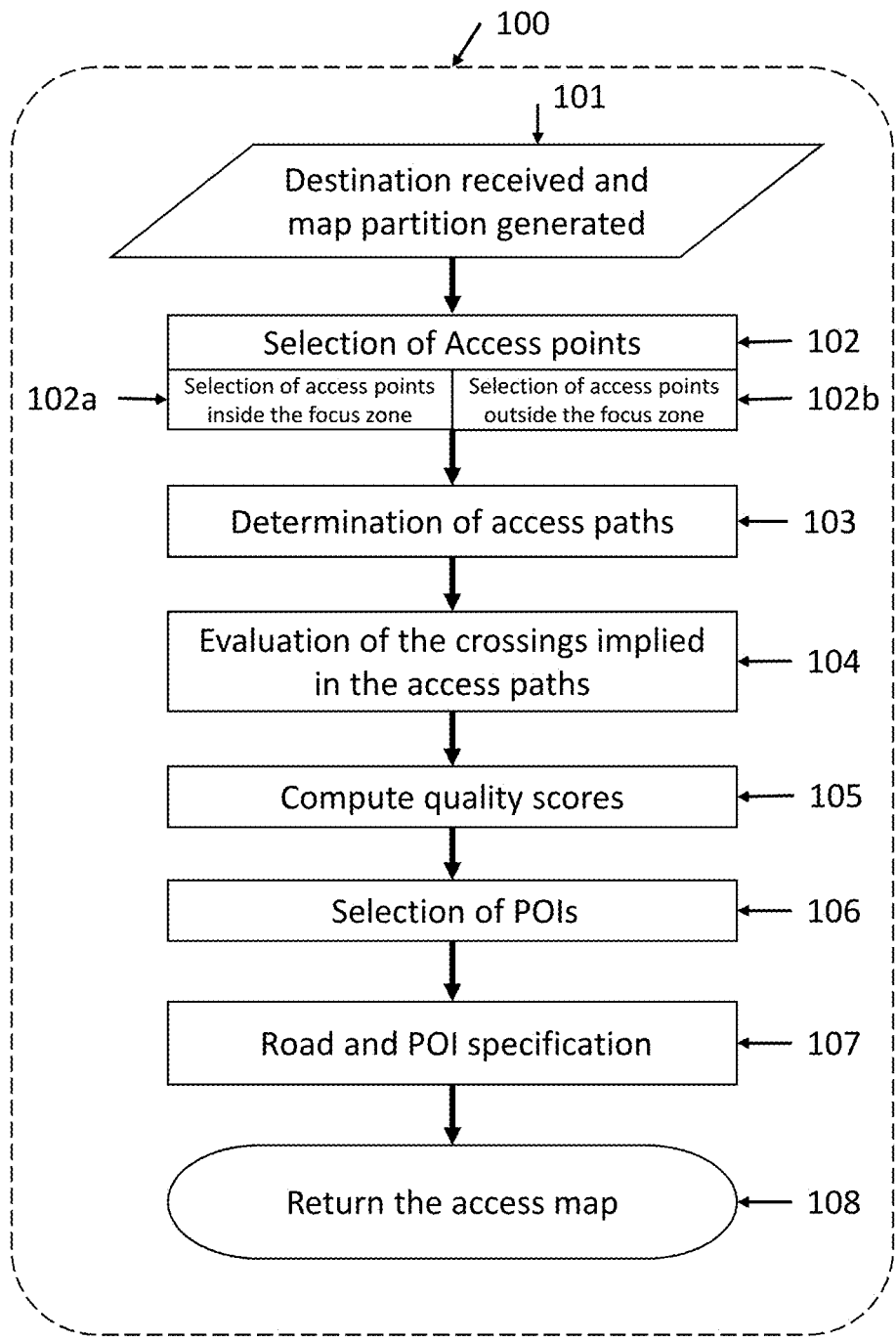
FIG. 2 represents an example method used to generate access maps.

A method 100 is outlined in FIG. 2 to generate access maps, which in an example may be performed by the one or more processors of the server 20.

As used herein, a road may mean a passage way allowing pedestrians and/or vehicles on which users travel without or with a transportation aid (such as using cars, motorcycles, bicycles, boats, rollerblades, skis, etc.) to travel between places or POIs. Roads include streets, car roads, pedestrian paths, ski runs, cycle paths, waterways, combinations thereof. A crossing may mean a location or area at least two roads pass through (e.g., that intersect or pass near—over, under, next to, etc.). A complexity score of a crossing may be a score (value) indicative of a complexity of the crossing. The complexity score of a crossing may be determined based on the number of roads of the crossing, the geometry defined by the roads, and/or one or more other characteristics. A crossing may be more complex as its complexity score increases and vice versa.

A quality score of a POI may mean a score (value) indicative of a relevancy of the POI to facilitate orientation or wayfinding. The quality score of a POI may be determined based on the access path considered and on the way a crossing with direct proximity to the POI is passed through with the access path. For example, if a crossing is traversed in more than one access path, the quality score of the POI might be higher for an access path where the POI is located on the outbound road than for an access path where the POI is not located on the outbound road.

Generation of the map and partition is performed at 101. At 101, the destination (e.g., name or location, such as latitudinal and longitudinal coordinates) is received, and the map surrounding the destination retrieved. The destination point is provided to the server 20 by the user 13 via the computing device 10. The request is formulated through the computing device 10. When receiving a request, the server 20 obtains from the server 15 a map comprising the destination point, as well as map data.

The map is then partitioned by the server 20 to divide it into two areas: a focus zone (or area); and the rest of the map, outside the focus zone. The focus zone is determined as an area of a given radius (e.g., 1 kilometer (km), 2 km, 3 km, 5 km, etc.) around the destination.

For an access map for a destination in an urban area, the focus zone could be set based on a walking distance around the destination (e.g., of a 100-999 meters to a 1-5 km around the destination). Alternate access maps, may cover locations of interest such as a national park, a historical village, an amusement park, a ski resort, and bike trails. The radius of the focus zone may be determined based on the activity near the destination and the anticipated mode of transportation a user may experience within a focus zone. The radius of the focus zone may additionally or alternatively be determined based on one or more other parameters. While the example of the radius of the focus zone is provided, the present application is also applicable to other dimensions and shapes of the focus zone (e.g., dimensions of a rectangle forming the focus zone).

The method hereunder described allows higher level of details to be taken into account in the focus zone.

For the rest of the map, outside of the focus zone, a smaller level of details (i.e., less details) is provided since the end user would be not be walking, but would be traveling through public transportation, or by car or bike for example.

Selection of access points is performed at 102. Access points may be facilities that allow a change of transportation mode, which may be considered waypoints, and which are used for guiding users (e.g., visitors). For these applications, users travel with various transportation means (e.g., bus, tram, subway, car, bike, pedestrian, plane, waterbus, ferry etc.) and through the corresponding access points (e.g., bus stops, tram stops, subway stops, airports, car parking lots, bike parking lots, ferry landings, etc.). A change of mode of transport can for example be a change from one transportation mode, whether public (subway, train, tram, bus, plane, ferry, etc.), semi-private (e.g., taxi, carpool, etc.), or private (e.g., car, bike, pedestrian, etc.), to another transportation mode.

Applications other than urban district guidance can also be contemplated, such as the generation of access maps in the countryside. In such a case, an access point can be a noticeable place that the end-user can reach, for example by vehicle. The access map provides to the end-user preferred roads to reach the destination point from such access points.

The selection of the access points may be performed by the server 20 and involves: selecting access points within a focus zone at 102*a*, and selecting access points outside of the focus zone at 102*b*.

Determining access paths is performed at 103. Once the access points are selected, the server 20 determines the access paths which allow a user to reach the destination point starting from those selected access points.

Evaluation of the crossings implied in the access paths is performed at 104. Once the access paths are determined, the server 20 determines on the map the crossings which the paths traverse, and computes evaluation parameters. Examples of the evaluation parameters include probability to be crossed and/or a complexity score. The evaluation parameters will be further used to select POIs within the area surrounding the crossings.

Quality scores are determined/calculated at 105. The server 20 selects POIs which are within the area surrounding crossings within the focus zone and determines quality scores for those POIs.

Selection of POIs is performed at 106. Based on the previous evaluation of crossings and on the quality scores computed for the POIs, the server 20 selects the most relevant (e.g., most useful for wayfinding) ones of the POIs for the access map. For example, the server 20 may select the M ones of the POIs with the M highest quality scores, where M is an integer greater than one.

Road and POI specification is performed at 107. Based on the original map, roads are added, removed, and/or highlighted in the map according to relevance to reach the destination, and the selected POIs are drawn on the access map. The roads that may be added and highlighted connect to the destination, while roads that lead away from the destination may be removed.

Returning the access map is performed at 108. The generated access map is returned (transmitted) by the server 20 to the computing device 10 for storage and administration to final end users. For example, the computing device 10 may displaying the access map on a user interface, either on its own or by augmenting additional information (e.g., ads, hyperlinks to additional information for POIs and crossings, etc.). Additionally or alternatively, the computing device 10 may audibly output information regarding the access map, such as via one or more speakers.

Figure 3:
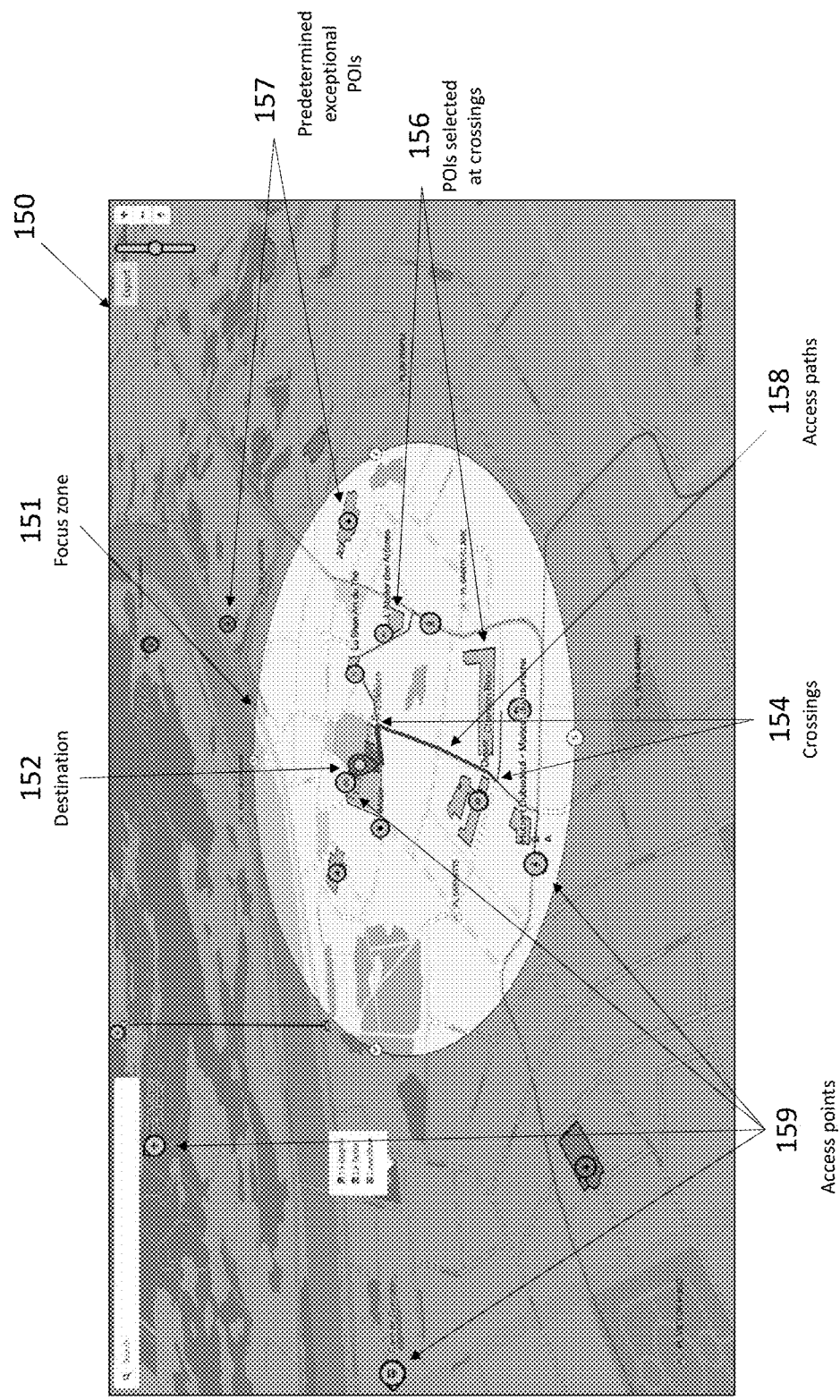
FIG. 3 illustrates an example of access map generated by the method.

An example of an access map 150 generated using the method of FIG. 2 is illustrated in FIG. 3. The access map 150 includes focus zone 151, destination 152, crossings 154, selected POIs 156 (displayed in a first color, such as green/a first shade of grey), predetermined POIs 157 (displayed in a second color, such as blue/a second shade of grey), access paths 158 (displayed in a third color, such as red/a third shade of grey), and example access points 159 (displayed in a fourth color, such as yellow/a fourth shade of grey).

Figure 4:
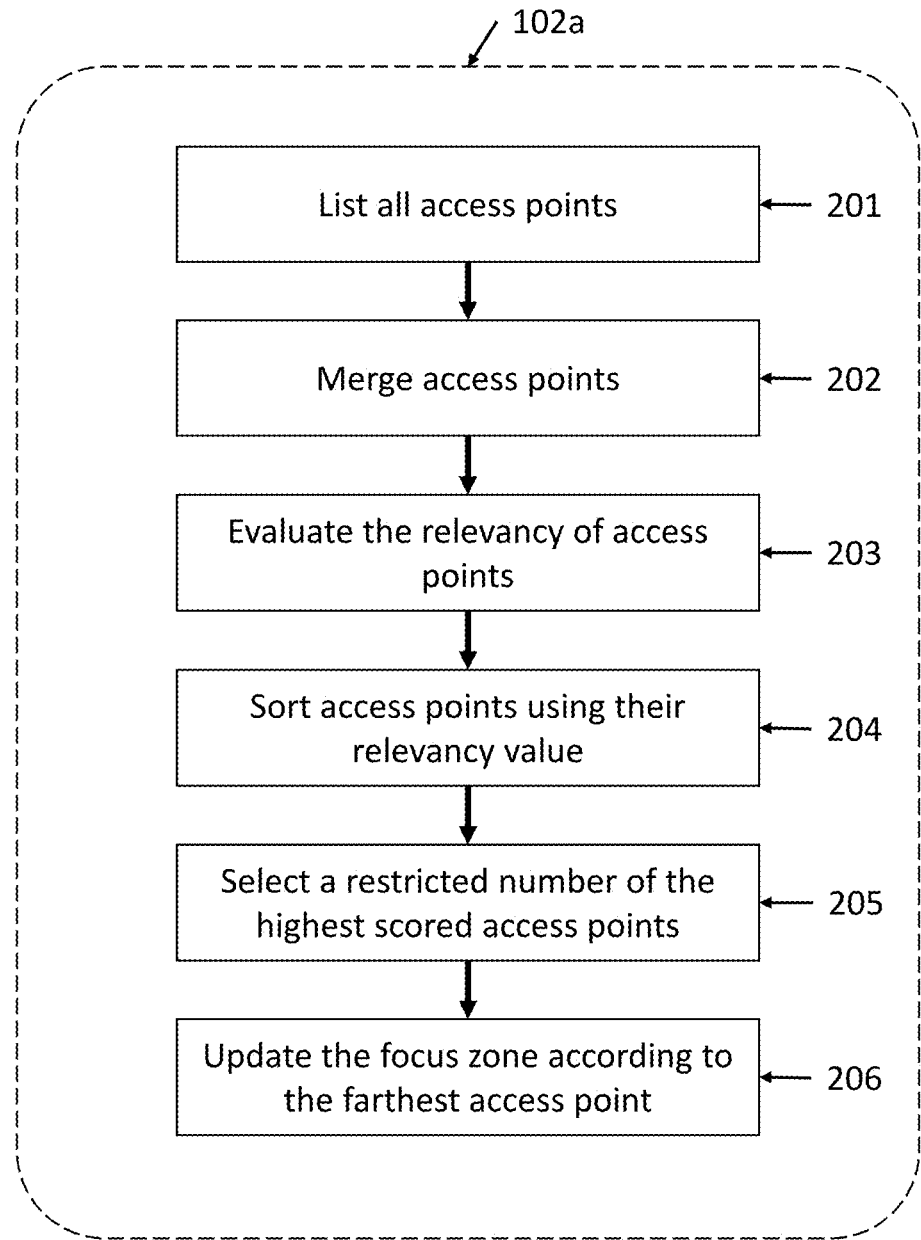
FIG. 4 represents an example method used to select access points inside a focus zone.
Figure 5:
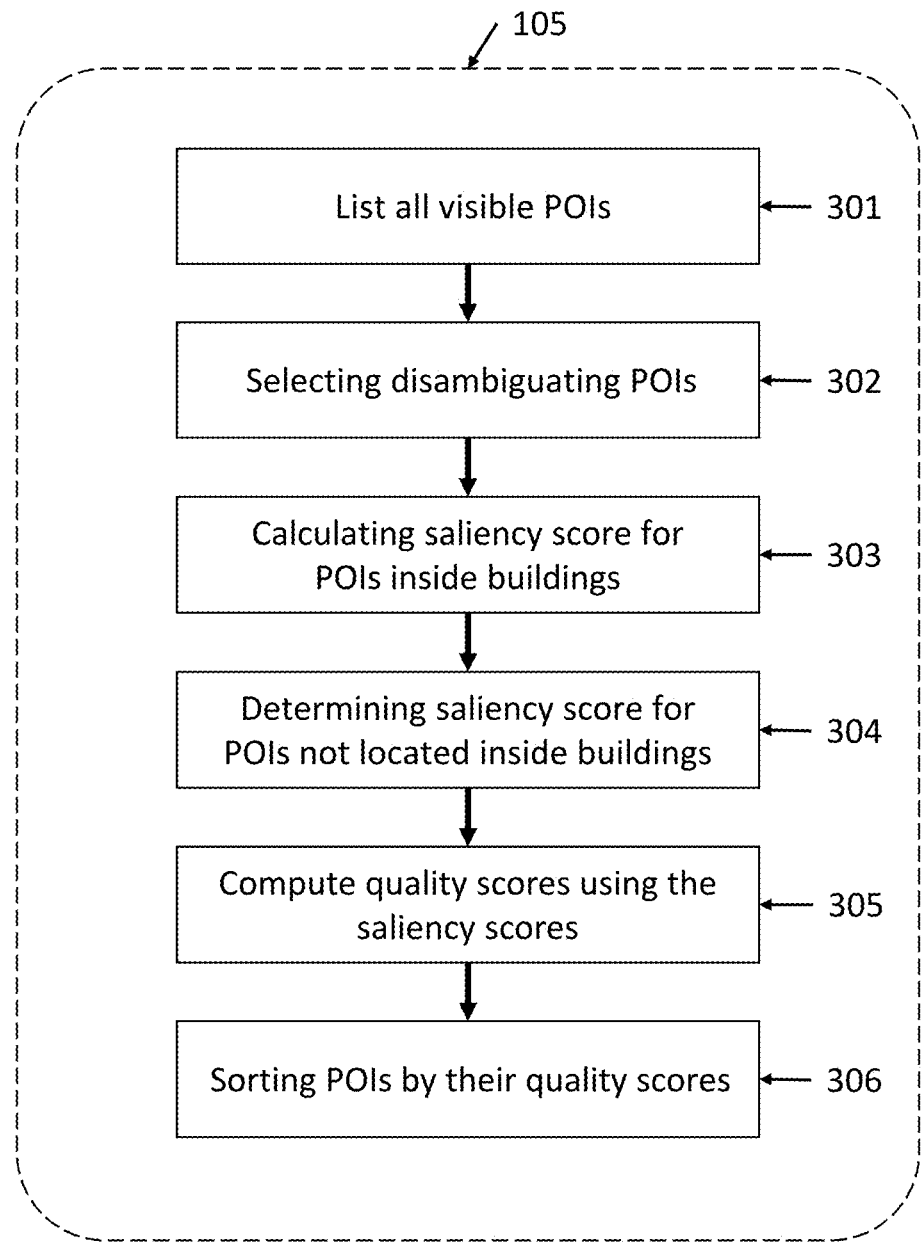
FIG. 5 represents an example method used to evaluate the POIs.
Figure 6:
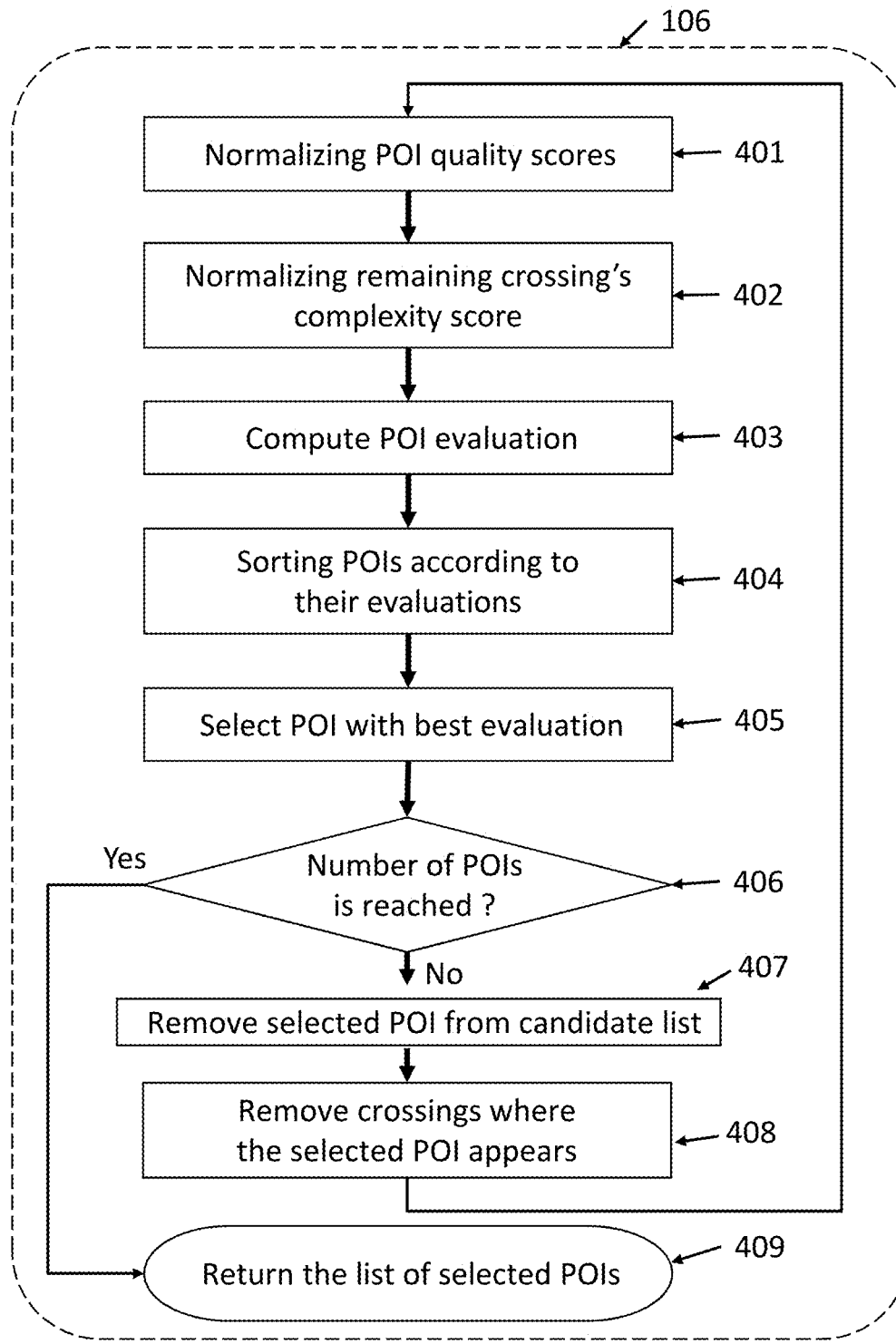
FIG. 6 represents an example method used to select the best POIs.

102 to 107 shown in FIG. 2 are hereunder further detailed in the example of an access map for an urban district/area shown in FIG. 3 with further reference to FIGS. 4 to 6.

Selection of Access Points

A list of access points is retrieved by the server 20 within the map data received from the server 15. Two different processes may be performed by the server 20 to determine the access points to be kept for the map for the focus zone and for the rest of the map.

Selection of access points in the focus zone is performed at 102*a*. One method performed by the server 20 for determining the access points at 102*a* to be selected for the focus zone shown in FIG. 2 is provided in FIG. 4.

At 201, listing includes listing all existing access points and selecting among those access points corresponding to transportation access points in the focus zone. The server 20 also retrieves from the map data the various public transportation lines for which those access points are stops.

At 202, merging includes merging related access points of the same type or different types of transportation (e.g., tram, bus, subway). Types of access points are defined by the public transportation lines to which they belong. For example, in merging related access points of the same type, such as two bus stops on the same road, one for each direction, may be merged if they would appear close to each other on the visual (access) map. Merging related access points of different types of transportation, such as a bus stop and a tram stop in the same area, where a connection may be readily made between these two types of transportation, may be merged to indicate a connection on the visual map (e.g., similar to a transportation hub).

In this regard, the distance between two or more access points detected by the server 20 as belonging to the same type or different types of transportation and located on the same road, crossing, or area is compared to a predetermined threshold (e.g., 10-100 meters) distance. The predetermined threshold distance is less than the radius of the focus zone. The two access points are merged if the distance between the two access points is less than the predetermined threshold distance. The threshold distance can be set, for example, based on the actual zoom level of the map.

At 203, evaluating includes evaluating relevancy of access points by determining/calculating a quality score for each access point that is a function of the following parameters that may be based on user preferences or learned from user behavior (e.g., using location information, transportation methods, etc.). The access point's type in order to reflect the relative importance of the different transportation types may be used. In an example, a higher weight may be given to subways stops. Tram stops and then car parking, bike parking zones, and bus stops may be given less important weights. The access point's distance to the destination may also be considered. For example, the farther an access point is from the destination, the lower its quality score may be, and vice versa. For public transportation, the number of lines traveling through the access point (e.g., tram, bus, subway lines, etc.) may also be considered. For example, the greater the number of lines that go through an access point, the greater the relevancy score of that access point and vice versa. A capacity of the access point may also be considered. For example, a parking lot capacity and/or bike parking capacity may be considered. As an example, the higher the capacity of an access point, the higher its relevancy score may be and vice versa. As an example, the following equation can be used, for example, to calculate the relevancy score:

$$\text{relevancy} = \frac{1}{\text{distance}} \times \text{characteristic} \times \text{type}$$

Where, characteristic is an arbitrary integer value given to some features of the access point, representing user's preferences, for example a train station where only one train line is present could be given the value 1 whereas one where two trains line are present could be given the value 2. Type is an integer value given to the type of access point, representing user's preferences, for example a train station could be given a higher value (4) than a parking (3). In various implementations, the equation for calculating a relevancy score includes the number of transportation lines and/or the capacity of the lines.

At 204, sorting includes sorting the access points according to their quality score, such as highest to lowest.

At 205, selecting includes selecting at least one access point per relevant type. When there are multiple different transportation types available, some may be considered irrelevant (e.g., because a transportation type is not frequently used compared to the other transportation types). For such irrelevant transportation types, no corresponding hub (or access point) will be selected.

For each type of access point, the selected access point is that with the highest relevancy score. Other access points of the same type can be added depending on their relevancy score, until a predetermined maximum number of selected access points is reached. The maximum number of selected access points can be different from one type to the other and can for example be limited for less relevant types of transportation (car parking for example).

Adjusting at 206 includes adjusting the focus zone to be displayed to the end-users to correspond with the farthest selected access point, with a margin of 40% for example.

Selection of access points outside of the focus zone step is performed at 102b. Additional access points may be selected by the server 20 outside of the focus zone at 102b. Users traveling long distances to a destination often go through principal access points that are farther away, like railway stations or airports.

The access map may be generated to serve users traveling from farther away and through these principal transportation access points to reach and enter the focus zone, the last mile(s) near the destination. In order to select these access points, the method can find the closest train stations, airports, and highways (access points). However, contrary to access points in the focus zone, these access points are selected mainly just to be represented on the access map but are not used for the determination of access paths, except if they are in the focus zone.

Determination of Access Paths

Returning to FIG. 2, at 103 all access paths from access points to the destination in the focus zone are determined. This may be done using a trip planning algorithm, such as Open Source Routing Machine (OSRM) for Open Street Map (OSM), implemented on the server 20.

When the trip planning algorithm determines the more than one access paths from an access point to the destination and the more than one access paths have equal lengths within a margin, either in terms of distance or in terms of travel time, these multiple access paths can be used all together in the subsequent steps.

These generated access paths serve two purposes: determining the road crossings a user may pass through (e.g., to intersect or pass near) in the focus zone; and highlighting the access paths on the generated access map.

Determination of the Crossings Implied in the Access Paths

The method provides POI information to support navigation by adding POI information to crossings along access paths. Thus, the number of POIs across the map may be limited to avoid cluttering (via too many POIs). The method may include selecting which crossings to display on the map. This may be done according to the following: computing the probability that a crossing is (or will be) passed through; evaluating the complexity of the crossing by computing a complexity score for each crossing; and selecting ones of the crossings with the k highest scores, where k is an integer greater than one.

Computation of Crossing Probability

For each crossing in at least one the access paths, the server 20 determines the probability of the crossing being passed through. Considering each path as equally probable, the probability may be determined as the number of paths traveling through the crossing divided by the total number of paths considered, which may be represented as follows:

$$\text{crossing probability} = \frac{nb \text{ path going through crossing}}{\text{total } nb \text{ of path}},$$

where crossing probability is the probability for the crossing, nb path going through crossing is the number of paths traveling through the crossing, and total nb of path is the total number of paths considered. In various implementations, weights may be applied to the probabilities according to the type of access point from which the access path originates. For example, end users might come more often by tram and car, and less by bus or bike. Thus, one predetermined weight (value) may be assigned to each type of access point.

Computation of Crossing Complexity

Each crossing has a level of difficulty based at least in part on (i) the physical configuration of the crossing and (ii) to the traversal of the crossing in terms of inbound and outbound paths. The server 20 determines a crossing's complexity score based on one, more than one, or all of the following parameters: (1) the number of inbound and outbound paths at the crossing; (2) the need to change direction in the crossing; and (3) the existence of confusing paths. Regarding (3), if around the outbound road some other paths leave the crossing in a predetermined angle (e.g., less than 30 degrees), there may a risk of confusion with the direction to take. Therefore, the existence of such confusing paths increases the complexity score of a crossing. Regarding (1), a corresponding confusing road indicator may be set to 1 when confusing paths exist and to 0 otherwise. For example, there is less complexity to understand a crossing involving 3 paths (e.g., confusing road indicator=0), than one involving 6 paths (e.g., confusing road indicator=1). This number may be normalized by the maximum number of paths observed on all considered crossings in the access map. Regarding (2), it is simpler and may not require much additional information to go straight through a crossing than when a change in direction is required. A road change indicator may be set to 0 when the direction to follow from the inbound path into the outbound path is straight and may be set to 1 when a turn is required.

Using the parameters above, the server 20 may determine a crossing complexity for each crossing in at least one access paths using the equation:

complexity=normalized $nb_{streets} \times$(1+directionChangeIndicator+confusingStreetIndicator), where complexity is the complexity score of the crossing, normalized $nb_{streets}$ is the confusing road indicator normalized by the maximum number of paths observed on all considered crossings, directionChangeIndicator is the direction change indicator of the crossing, and confusingStreetIndicator is the confusing street indicator for the crossing. In the case of public transportation access points, since there is no incoming path, an automatic direction change is considered, so the associated indicator may be set to 1. The other parameters are still consistent.

Selection of POIs

In order to select the most relevant POIs to disambiguate crossing, all of the POIs may be given a quality score as illustrated in FIG. 5 at 105 by the server 20 according to the following procedure for each crossing with a non-zero probability: 1) listing, at 301, all POIs in a close visibility (e.g., less than a predetermined distance, such as 20 meters as an example) or selection range near a crossing; 2) selecting, at 302, the POIs, for each path segment, that may help to disambiguate a path with respect to a nearby crossing. 302 includes: determining a bounding box with a length corresponding to an enlarged visibility range and a width including a marginal width on each side of the path and keeping POIs that are at least partially included in the visibility bounding box. This is to select only POIs or buildings with facades that will be visible from the crossing when looking into the path. 303 includes calculating a saliency score for all remaining POIs located in buildings representing the visual saliency of the POI, the saliency score depending on: the facade length of the building; the closest facade distance to the intersection; the height of the building; the visibility score of the POI, depending on its category. Some categories of POIs are in general more visible than others. For example, supermarkets and shops can be considered as more visible than a public library for instance. Thus, the visibility score may be set a priori accordingly to this expectation. For example, supermarket=50%, Shop/Restaurant=40%, Public library=10%. Regarding facade length, where the facade is the side of the building facing the path and that is almost parallel to the path (e.g., up to a predetermined maximum angle) and closer that a maximum distance with respect to the path. If the building includes multiple POIs, the facade length may be divided by the number of POIs. If the facade continues outside the bounding box, only the part of the facade that is within the bounding box may be considered. For example, the saliency score may be calculated using the equation:

$$\text{saliency score} = \frac{\text{visibility} \times \text{facade length} \times \text{height}}{\text{distance}},$$

where saliency score is the saliency score, visibility is the visibility score, distance is the distance to the closest facade, facade length is the facade length, and height is the height of the building.

At 304, determined are saliency scores for all POIs that are not located in buildings and belong to a category that is considered as worthwhile for providing directions, in particular in locations where no other POIs are present, depending on: their distance to the intersection/crossing; the visibility score of the POI, depending on its category (e.g., Fountain=100%, Bus/Tram stop=75%, Street advertisement=50%, Recycle bin=25%). In this example, the saliency score may be calculated using the equation:

$$\text{saliency score} = \frac{\text{visibility}}{\text{distance}},$$

where saliency score is the saliency score, visibility is the visibility score, distance is the distance to the POI.

At 305, quality scores are determined as the product of the saliency score of each POI and a given weight according to the path segment nature. If the path segment is the entrance to the traversal, then the weight applied to the saliency score may be a first predetermined weight (e.g., 40%), if it is the exit of the traversal, then the weight may be a second predetermined weight (e.g., 60%), and a third predetermined weight (e.g., 0%) may be applied for other types of path segments.

At 306, POIs are sorted per quality score for each crossing path side, from highest to lowest. From the list of POIs obtained a predetermined number of POIs can then be selected. This predetermined number may be a parameter set to a predetermined value by default or set based on user input. Since a goal may be to clarify the access map, the predetermined number may be set based on the size of the focus zone area, as a density parameter. Since a crossing may have multiple complexity scores and associated POIs with different quality scores according to traversal configuration (in/out path), the method may consider crossing and traversal association where the probability to go through a transversal is the crossing probability divided by the number of transversals.

The selection of POIs is performed at 106 by iterating over the following steps as illustrated in FIG. 6, where the list of remaining crossings is initially the list of all crossings passed through in at least one access path, and the candidate list is the list of POIs is generated by: 1) normalizing, at 401, POI quality scores across the map independently of crossings; 2) normalizing, at 402, remaining crossing's complexity score; 3) determining, at 403, a POI evaluation for each POI, as the product of its normalized quality score with the crossing probability and the normalized crossing complexity, and summing this product for each crossing where the same POI appears; 4) sorting, at 404, POIs according to the POI evaluation (e.g., highest to lowest); 5) selecting, at 405, the POI with the best (e.g., highest) evaluation; 6) if the number of selected POI is reached (at 406), then exiting the procedure and returning, at 409, the list of POIs selected; 7) removing, at 407, the POI selected at 405 from the candidate list; 8) removing, at 408, all crossings where the selected POI appears from the remaining crossings list, independently of the traversal. The example of FIG. 6 may be repeated until the predetermined number of selected POIs is reached at 406.

The procedure above limits the number of POIs per crossing to one. Also, via the procedure above, it is possible to adjust the choice to multiple POIs per crossing. In this example, it is possible to maintain a crossing in the candidate list if the number of POI for this crossing is not reached and possibly reduce the crossing complexity.

Additionally, some predetermined (e.g., exceptional) POIs can be added to the access map. These predetermined POIs may be, for example, particular POIs well known at the scale of the considered region and that are particularly visible. An example of such a predetermined POI includes, for example, the Eiffel Tower in the city of Paris. When one of these predetermined POIs is present in a particular region it is always included in the map, whether it belongs to an access path or not, as it allows the user to orient himself.

Path Simplification and Highlighting

The server 20 combines the access points, the access paths, and the selected POIs to display them on generated access map. First, all of the selected POIs are represented on the generated access map. The destination building is represented by a building shape with the destination icon with a specific color. For building POIs inside the focus zone, each POI is represented by the building shape with an icon corresponding to the type of the POI. For non-building POIs inside the focus zone, each POI may be represented by an icon corresponding to the type of the POI. For predetermined or large (e.g., infrastructure) POIs outside of the focus zone, each POI may be represented by icon or shape with an associated description. For road directions, directional labels may be provided on the visual map boundary. Transportation access points may be represented by icons corresponding to the transportation mode. Main access points, outside the focus zone, may have larger icons than the access points in the focus zone. Paths, parks and squares may be displayed by default in a predetermined color (e.g., grey) and in the same size except as follows. In the focus zone, paths may be colored according to their type. Important paths, such as boulevard, may be displayed in a predetermined color that is more visibly attractive. Secondary and tertiary paths may be displayed in predetermined colors that are more dull (visually less attractive). In the focus zone, paths that are part of trips between access points and the destination may be displayed with different sizes according to their type. Roads may be colored and displayed in a proper size in the visual map when they represent the trip between a direction and the closest associated access point, Tram and subway lines may be displayed at a predetermined size using a predetermined color: inside the focus zone when they go through the selected transportation access points; and outside the focus zone when the line links a main transportation access point outside the focus zone to the access point inside the focus zone. Other lines may be displayed in the same size but may be displayed in a predetermined color (e.g., black) with a fading out effect from colored to black when the line goes out of the focus zone and beyond the main transportation access point in the visible map. On the boundary of the focus zone, at the intersection with lines, the map may be displayed with public transportation lines labeled.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable code that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of generating an access map for reaching, independent of origin, a travel destination, the method comprising:
by one or more processors, selecting a set of access points in a focus zone that identifies an area around the travel destination;
by the one or more processors, determining access paths to and from the travel destination through one or more access points in the set of selected access points;
by the one or more processors, listing crossings that the determined access paths pass through;
by the one or more processors, for each of the listed crossings:
determining a probability that a listed crossing is passed through by an access path;
determining at least one complexity score of the listed crossing;
determining a set of points of interest (POIs) along access paths passing through the listed crossing; and
determining quality scores for the POIs, respectively, of the set of POIs, the quality score of one of the POIs reflecting a utility of that one of the POIs to facilitate orientation;
by the one or more processors, selecting POIs from the set of POIs based on the quality scores of the POIs, respectively, the complexity score of the listed crossing, and the probability of the listed crossing;
by the one or more processors, generating the access map including the access paths and the selected POIs; and
by the one or more processors, outputting the access map including at least one of:
displaying the access map on a display of a computing device; and
outputting information of the access map via a speaker of the computing device.

2. The method of claim 1, wherein selecting the set of access points includes:
listing all access points which are in the focus zone around the travel destination;
determining quality scores for the access points in the focus zone, respectively, the quality score of an access point indicative of a relevance of the access point to a user in navigating to the travel destination; and
selecting a predetermined number of the access points with the highest quality scores as the set of access points.

3. The method of claim 2, wherein determining the quality scores includes determining the quality score for an access point based on:
a type of transportation through which the access point can be reached;
a distance between the access point and the travel destination; and
if the access point is public transportation, a number of public transportation lines through which the access point can be reached.

4. The method of claim 2, wherein determining the quality scores includes determining the quality score for an access point based on:
a type of transportation through which the access point can be reached;
a distance between the access point and the travel destination; and
if the access point is a parking facility, a vehicle capacity of the parking facility.

5. The method of claim 2, wherein determining the quality score of an access point includes determining the quality score of the access point based on a type of transportation usable to reach the access point.

6. The method of claim 1, wherein determining the probability that the listed crossing is passed through by the access path includes setting the probability based on a ratio of a number of access paths traveling through the crossing to a total number of access paths in the focus zone.

7. The method of claim 1, wherein determining the complexity score of the listed crossing includes determining the complexity score of the listed crossing based on:
a number roads at the listed crossing; and
a need to change direction at the crossing.

8. The method of claim 1, wherein determining the complexity score of the listed crossing includes determining the complexity score of the listed crossing based on whether an outbound access path at the listed crossing forms an angle that is less than a predetermined angle relative to an inbound access path used to reach the listed crossing.

9. The method of claim 1, wherein determining the set of POIs along access paths passing through the listed crossing includes adding a building located within a predetermined distance of the listed crossing to the set of POIs.

10. The method of claim 9, wherein:
determining the quality score of the building includes determining the quality score of the building based on a saliency score of the building; and
the method further includes determining the saliency score of the building based on characteristics of the building.

11. The method of claim 10, further comprising determining the saliency score of the building based on:
a length of a facade of the building;
a distance between a closest point of the facade and the listed crossing; and
a height of the building.

12. The method of claim 1, wherein:
determining quality scores for the POIs includes determining the quality score of a POI based on a saliency score of the POI; and
the method further includes determining the saliency score of the POI based on a type of the POI.

13. The method of claim 1, wherein generating the access map further includes adding predetermined POIs stored in memory to the access map.

14. The method of claim 13, wherein generating the access map further includes adding graphical representations of the predetermined POIs to the access map.

15. The method of claim 1, wherein determining the set of POIs along access paths passing through the listed crossing includes:
listing all POIs within a predetermined distance from the listed crossing;
determining a bounding box around an outbound access path of the listed crossing, the bounding box having a predetermined length corresponding to a visibility range from the listed crossing and a predetermined width to include buildings on each side of the outbound access path;
selecting ones of POIs the listed within the bounding box;
determining the quality scores of the selected ones of the POIs listed within the bounding box; and
selecting POIs from the selected ones of the POIs listed within the bounding box based on the quality scores for the set of POIs.

16. The method of claim 15, wherein determining the quality scores of the selected ones of the POIs listed within the bounding box includes determining the quality score of a selected one of the POIs listed within the bounding box based on whether the selected one of the POIs listed within the bounding box is located on an inbound path of the crossing, an outbound path of the crossing, or another type of path of the crossing.

17. The method of claim 16, wherein determining the quality score of the selected one of the POIs listed within the bounding box includes:
setting the quality score of the selected one of the POIs listed within the bounding box to a first score when the selected one of the POIs listed within the bounding box is located on an outbound path of the crossing; and
setting the quality score of the selected one of the POIs listed within the bounding box to a second score when the selected one of the POIs listed within the bounding box is located on an inbound path of the crossing,
wherein the first score is greater than the second score.

18. The method of claim 1, wherein selecting POIs from the set of POIs based on the quality scores of the POIs, respectively, includes selecting k of the POIs from the set of POIs having the k highest quality scores, respectively,
wherein k is an integer greater than two.

19. The method of claim 1, wherein generating the access map includes:
representing the access paths and the selected POIs on the access map;
representing the travel destination on the access map;
representing transportation access points on the access map;
highlighting paths passing through at least one of the access paths; and
not highlighting paths that do not pass through at least one of the access paths.

20. A system for generating an access map for reaching, independent of origin, a travel destination, the system comprising:
one or more processors; and
memory including code that, when executed by the one or more processors, perform functions comprising:
selecting a set of access points in a focus zone that identifies an area around the travel destination;
determining access paths to and from the travel destination through one or more access points in the set of selected access points;
listing crossings that the determined access paths pass through;
for each of the listed crossings:
determining a probability that a listed crossing is passed through by an access path;
determining at least one complexity score of the listed crossing;
determining a set of points of interest (POIs) along access paths passing through the listed crossing; and
determining quality scores for the POIs, respectively, of the set of POIs, the quality score of one of the POIs reflecting a utility of that one of the POIs to facilitate orientation;
selecting POIs from the set of POIs based on the quality scores of the POIs, respectively, the complexity score of the listed crossing, and the probability of the listed crossing;
generating the access map including the access paths and the selected POIs; and
outputting the access map including at least one of:
displaying the access map on a display of a computing device; and
outputting information of the access map via a speaker of the computing device.

* * * * *